US012681664B2

(12) United States Patent
Choi et al.

(10) Patent No.: US 12,681,664 B2
(45) Date of Patent: Jul. 14, 2026

(54) PAGE BUFFER CIRCUIT AND PERIPHERAL CIRCUIT OF A MEMORY DEVICE

(71) Applicant: SK hynix Inc., Icheon-si (KR)

(72) Inventors: Hyung Jin Choi, Icheon-si (KR); Chan Hui Jeong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 349 days.

(21) Appl. No.: 18/465,838

(22) Filed: Sep. 12, 2023

(65) Prior Publication Data

US 2024/0385773 A1 Nov. 21, 2024

(30) Foreign Application Priority Data

May 18, 2023 (KR) ........................ 10-2023-0064500

(51) Int. Cl.
 *G06F 3/06* (2006.01)
 *G11C 11/4094* (2006.01)
 *G11C 16/24* (2006.01)
 *G11C 16/26* (2006.01)
(52) U.S. Cl.
 CPC ............ *G06F 3/0656* (2013.01); *G06F 3/061* (2013.01); *G06F 3/0679* (2013.01)
(58) Field of Classification Search
 None
 See application file for complete search history.

(56) References Cited

U.S. PATENT DOCUMENTS

2013/0033940 A1* 2/2013 Cho ........................ G11C 16/06
                                                          365/185.25
2013/0194872 A1* 8/2013 Sim ........................ G11C 16/26
                                                          365/185.25
2014/0369133 A1* 12/2014 Lee ........................ G11C 16/08
                                                          365/185.21
2022/0108757 A1* 4/2022 Choi .................... G11C 7/1087

FOREIGN PATENT DOCUMENTS

KR        101985952 B1    6/2019
KR        102253836 B1    5/2021
KR      1020220000251 A   1/2022

* cited by examiner

*Primary Examiner* — Anh Q Tran
(74) *Attorney, Agent, or Firm* — WILLIAM PARK AND ASSOCIATES LTD.

(57) ABSTRACT

A page buffer circuit of a memory device includes a sensing circuit configured to sense a voltage level of a sensing node changed according to a state of a bit line during a sensing operation. The page buffer circuit also includes a clamping circuit connected to the sensing node, wherein the claiming circuit is configured to control the voltage level of the sensing node not to drop below a clamping level in a predetermined period of the sensing operation.

18 Claims, 5 Drawing Sheets

PAGE BUFFER CIRCUIT AND PERIPHERAL CIRCUIT OF A MEMORY DEVICE

CROSS-REFERENCES TO RELATED APPLICATION

The present application claims priority under 35 U.S.C. § 119(a) to Korean application number 10-2023-0064500, filed on May 18, 2023, in the Korean Intellectual Property Office, which is incorporated herein by reference in its entirety.

BACKGROUND

1. Technical Field

The present teachings relate to a page buffer of a memory device.

2. Related Art

An electronic device may include a number of electronic components, and among them, a computer system may include a number of electronic components consisting of semiconductors. Among semiconductor devices constituting the computer system, a host device such as a processor or a memory controller may perform data communication with a memory device. The memory device may include a plurality of memory cells, which may be specified as word lines and bit lines, and store data therein.

A memory device may determine a state of a memory cell connected to a bit line by sensing a state of the bit line, that is, a voltage or current. Such a sensing operation may be performed in a read operation, a program verification operation, and an erase verification operation of the memory device. Therefore, it may be required to develop a technique for improving the accuracy of the sensing operation.

SUMMARY

A page buffer circuit of a memory device according to an embodiment of the present disclosure may include: a sensing circuit configured to sense a voltage level of a sensing node changed according to a state of a bit line during a sensing operation; and a clamping circuit connected to the sensing node, the clamping circuit configured to control the voltage level of the sensing node not to drop below a clamping level in a predetermined period of the sensing operation.

A page buffer circuit of a memory device according to an embodiment of the present disclosure may include: a sensing circuit configured to compare a voltage level of a sensing node changed according to a state of a bit line with a reference level and store the comparison result therein; and a clamping circuit configured to supply a voltage to the sensing node when the voltage level of the sensing node becomes lower than a clamping level lower than the reference level according to the state of the bit line.

A peripheral circuit of a memory device according to an embodiment of the present disclosure may include: a page buffer circuit configured to sense a voltage level of a sensing node formed on the basis of a state of a bit line and a clamping signal; and a control circuit configured to generate the clamping signal and transmit the clamping signal to the page buffer circuit.

DETAILED DESCRIPTION

Hereinafter, embodiments of the present teachings will be described in more detail with reference to the accompanying drawings.

Figure 1:
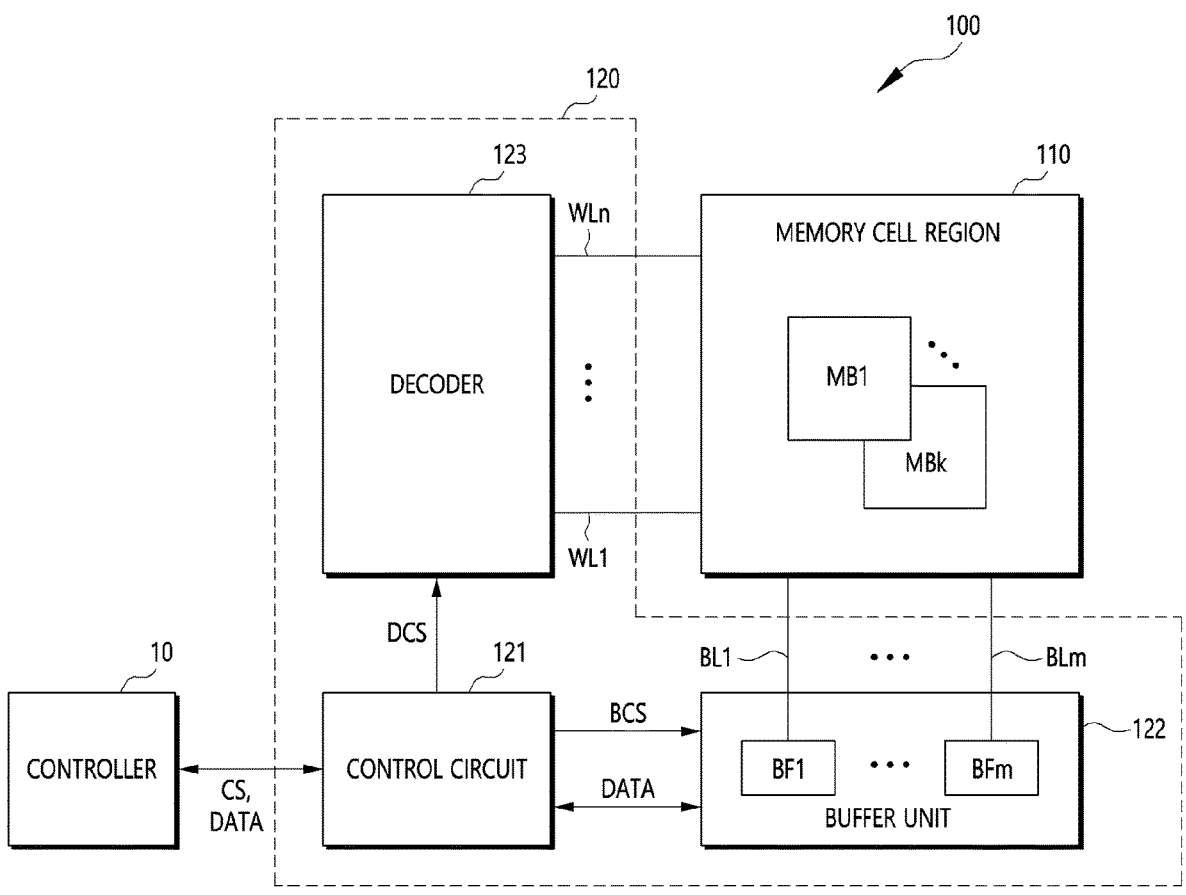
FIG. 1 is a block diagram illustrating a memory device, according to an embodiment of the present disclosure.

FIG. 1 is a block diagram illustrating a memory device 100, according to an embodiment of the present disclosure.

Referring to FIG. 1, the memory device 100 may operate under the control of an external device, for example, a controller 10. For example, the memory device 100 may perform a program operation, a read operation, and an erase operation under the control of the controller 10. The memory device 100 may exchange signals CS and data DATA with the controller 10.

The memory device 100 may include various types of memory, such as NAND flash memory, 3D NAND flash memory, NOR flash memory, resistive random-access memory (RRAM), phase change memory (PRAM), magnetoresistive random-access memory (MRAM), ferroelectric random-access memory (FRAM), and spin transfer torque random-access memory (STT-RAM).

The memory device 100 may include a memory cell region 110 and a peripheral circuit 120.

The memory cell region 110 may include a plurality of memory blocks MB1 to MBk. A memory block may be a unit in which the memory device 100 performs the erase operation. That is, all data stored in a memory block may be simultaneously erased. Each of the memory blocks MB1 to MBk may be connected to the peripheral circuit 120 through word lines WL1 to WLn and bit lines BL1 to BLm. Each of the memory blocks MB1 to MBk may include a plurality of memory cells in which data are stored.

The peripheral circuit 120 may perform the program operation, the read operation, and the erase operation on the memory cell region 110 under the control of the controller 10. The peripheral circuit 120 may receive external signals including commands, addresses, and data from the controller 10, and perform internal operations of the memory device 100 in response to the external signals. In addition, the peripheral circuit 120 may perform a sensing operation of sensing a voltage or current formed in bit lines connected to the memory cells as the memory cells connected to the bit lines are turned on/off. The sensing operation may be performed as part of a program verification operation, the read operation, and an erase verification operation.

The peripheral circuit 120 may include a control circuit 121, a buffer unit 122, and a decoder 123. Each of the control circuit 121, the buffer unit 122, and the decoder 123 may be composed of hardware, software, firmware, or combinations thereof.

The control circuit 121 may control overall operations of the memory device 100 under the control of the controller 10. Specifically, the control circuit 121 may generate buffer control signals BCS on the basis of the external signals, and output the buffer control signals BCS to the buffer unit 122. The buffer control signals BCS may include a clamping signal. The control circuit 121 may generate the clamping signal, and transmit the clamping signal to page buffer circuits BF1 to BFm, during the sensing operation. The control circuit 121 may generate decoder control signals DCS, and output the decoder control signals DCS to the decoder 123. For example, the decoder control signals DCS may include operating voltages, for example, a program voltage, a read voltage, an erase voltage, and a verification voltage, having various levels, which are necessary for the program operation, the read operation, and the erase operation. Although not illustrated, the control circuit 121 may include an interface that communicates with the controller 10, and a voltage generation circuit that generates the operating voltages having various levels.

The buffer unit 122 may be connected to the memory cell region 110 through the bit lines BL1 to BLm. The buffer unit 122 may be connected to each of the memory blocks MB1 to MBk through the bit lines BL1 to BLm. The buffer unit 122 may include a plurality of page buffer circuits BF1 to BFm respectively connected to the bit lines BL1 to BLm. The page buffer circuits BF1 to BFm may be connected to the memory cells through the bit lines BL1 to BLm. The page buffer circuits BF1 to BFm may temporarily store data to be stored in the memory cells. The page buffer circuits BF1 to BFm may temporarily store data read from the memory cells. The page buffer circuits BF1 to BFm may exchange the data DATA with the control circuit 121. The page buffer circuits BF1 to BFm may simultaneously operate in response to the buffer control signals BCS, and thus the memory cells connected to each of the bit lines BL1 to BLm may be simultaneously accessed.

Each of the page buffer circuits BF1 to BFm may compare a voltage level of a sensing node, which is changed according to a state of a bit line, that is, a voltage level of the bit line or the amount of current flowing through the bit line, with a reference level and store the comparison result therein during the sensing operation. Each of the page buffer circuits BF1 to BFm may control the voltage level of the sensing node not to drop below a clamping level in a predetermined period of the sensing operation, on the basis of the clamping signal and the voltage level of the sensing node. Specifically, each of the page buffer circuits BF1 to BFm may supply a voltage to the sensing node when the voltage level of the sensing node becomes lower than the clamping level lower than the reference level according to the state of the bit line. Accordingly, noise due to a coupling phenomenon may be suppressed, and accuracy of the sensing operation may be improved.

The decoder 123 may be connected to the memory cell region 110 through the word lines WL1 to WLn. The decoder 123 may be connected to each of the memory blocks MB1 to MBk through the word lines WL1 to WLn. Under the control of the control circuit 121, the decoder 123 may select one or more word lines, which are connected to the memory cells on which the program operation, the read operation, or the erase operation is to be performed, from among the word lines WL1 to WLn, and apply the operating voltages having various levels to the selected word lines.

Figure 2:
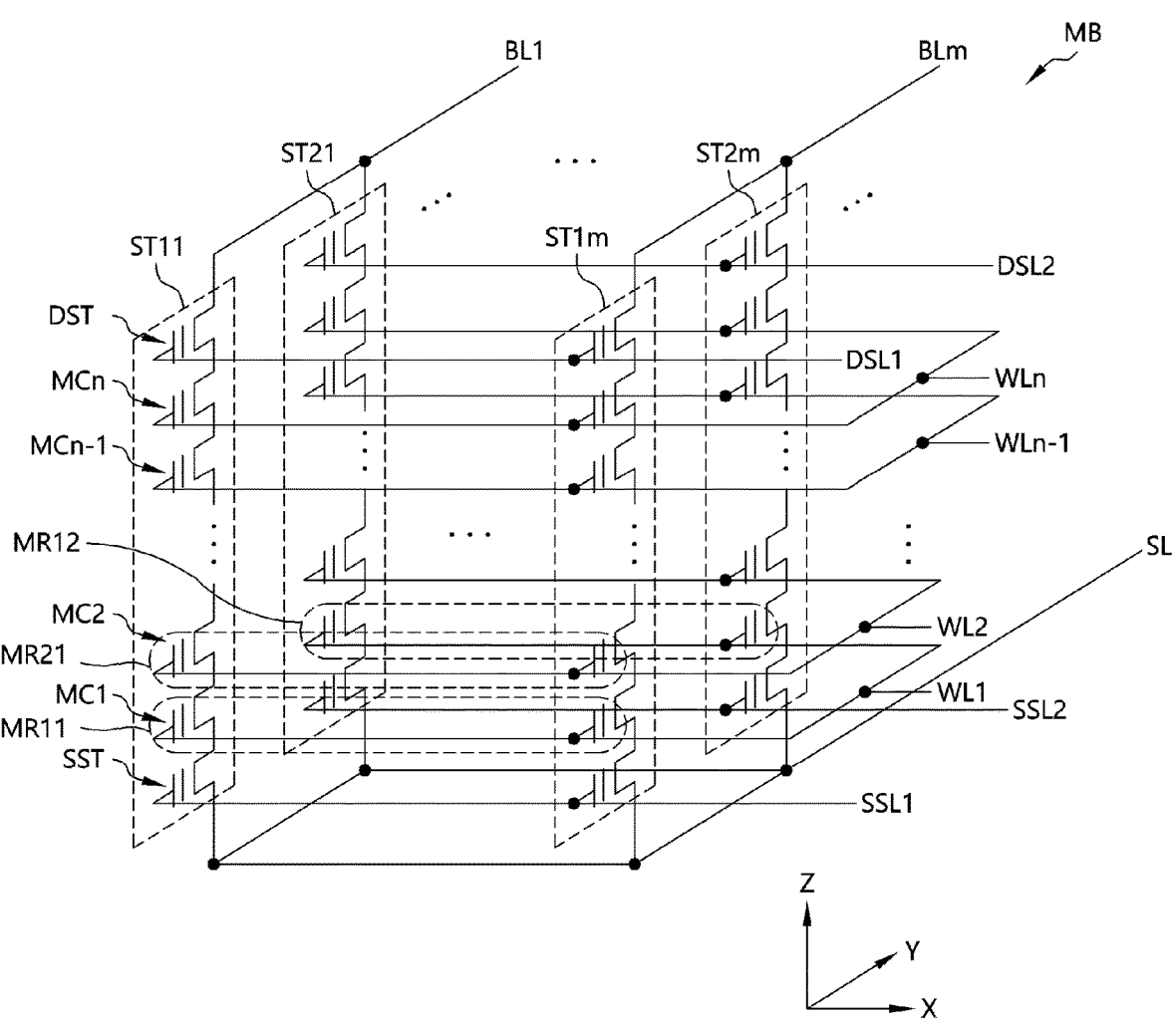
FIG. 2 is a circuit diagram illustrating a memory block, according to an embodiment of the present disclosure.

FIG. 2 is a circuit diagram illustrating a memory block MB, according to an embodiment of the present disclosure. Each of the memory blocks MB1 to MBk of FIG. 1 may be configured similarly to the memory block MB of FIG. 2.

Referring to FIG. 2, the memory block MB may include strings ST11 to ST1*m* and ST21 to ST2*m*. Each of the strings ST11 to ST1*m* and ST21 to ST2*m* may extend in a vertical direction, i.e., a Z direction. Within the memory block MB, m strings may be arranged in a row direction, i.e., an X direction. Although FIG. 2 illustrates that two strings are arranged in a column direction, i.e., a Y direction, this is for convenience in description, and three or more strings may be arranged in the column direction, i.e., the Y direction.

The strings ST11 to ST1*m* and ST21 to ST2*m* may have the same configuration. For example, the string ST11 may include a source selection transistor SST, memory cells MC1 to MCn, and a drain selection transistor DST, which are connected in series to one another between a source line SL and a bit line BL1. A source of the source selection transistor SST may be connected to the source line SL, and a drain of the drain selection transistor DST may be connected to the bit line BL1. The memory cells MC1 to MCn may be connected in series to one another between the source selection transistor SST and the drain selection transistor DST. According to an embodiment, a plurality of source selection transistors may be connected in series to one another between the source line SL and the memory cell MC1. According to an embodiment, a plurality of drain selection transistors may be connected in series to one another between the bit line BL1 and the memory cell MCn.

Source selection transistors at the same position in the vertical direction may be configured as follows. Specifically, gates of source selection transistors of strings arranged in the same row may be connected to the same source selection line. For example, gates of the source selection transistors of the strings ST11 to ST1*m* arranged in a first row may be connected to a source selection line SSL1. For example, gates of the source selection transistors of the strings ST21 to ST2*m* arranged in a second row may be connected to a source selection line SSL2.

According to an embodiment, source selection transistors of strings arranged in two or more rows may be connected in common to one source selection line. For example, the source selection transistors of the strings ST11 to ST1*m* and ST21 to ST2*m* arranged in the first and second rows may be connected in common to one source selection line, and the source selection transistors of strings arranged in third and fourth rows may be connected in common to one source selection line.

Drain selection transistors at the same position in the vertical direction may be configured as follows. Specifically, gates of drain selection transistors of strings arranged in the same row may be connected to the same drain selection line. For example, gates of the drain select transistors of the strings ST11 to ST1*m* arranged in the first row may be connected to the drain selection line DSL1. For example, gates of the drain selection transistors of the strings ST21 to ST2*m* arranged in the second row may be connected to the drain selection line DSL2.

Strings arranged in the same column may be connected to the same bit line. For example, the strings ST11 and ST21 arranged in a first column may be connected to the bit line BL1. For example, the strings ST1*m* and ST2*m* arranged in an m*th* column may be connected to a bit line BLm.

Gates of memory cells at the same position in the vertical direction may be connected to the same word line. For example, in the strings ST11 to ST1*m* and ST21 to ST2*m*, memory cells at the same position in the vertical direction as the memory cell MC1 may be connected to a word line WL1.

Among memory cells, memory cells connected to the same word line in the same row may constitute one memory region. For example, memory cells connected to the word line WL1 in the first row may constitute one memory region MR11. For example, memory cells connected to the word line WL1 in the second row may constitute one memory region MR12. For example, memory cells connected to a word line WL2 in the first row may constitute one memory region MR21. Each word line may be connected to a plurality of memory regions depending on the number of rows. Memory cells constituting one memory region may be simultaneously accessed.

According to an embodiment, the memory block MB may be further connected to one or more dummy word lines other than word lines WL1 to WLn. In this case, the memory block MB may further include dummy memory cells connected to the dummy word lines.

Figure 3:
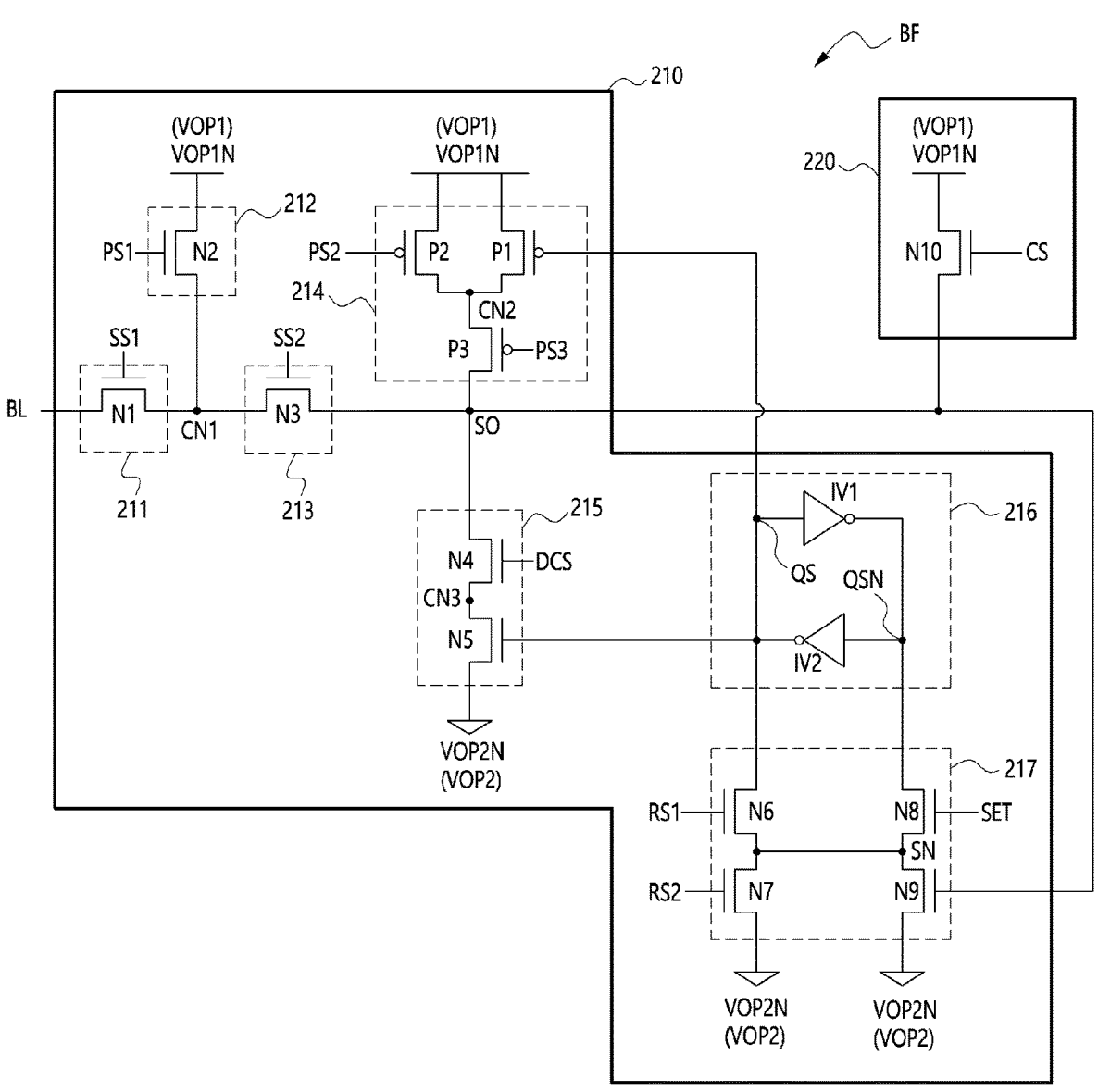
FIG. 3 is a specific circuit diagram illustrating a page buffer circuit, according to an embodiment of the present disclosure.

FIG. 3 is a specific circuit diagram illustrating a page buffer circuit BF, according to an embodiment of the present disclosure. Each of the page buffer circuits BF1 to BFm of FIG. 1 may be configured and operate similarly to the page buffer circuit BF of FIG. 3. A bit line BL may be a bit line connected to each of the page buffer circuits BF1 to BFm among the bit lines BL1 to BLm.

Referring to FIG. 3, the page buffer circuit BF may be connected to the bit line BL. The page buffer circuit BF may perform a sensing operation of sensing a voltage or current formed in the bit line BL as memory cells connected to the bit line BL are turned on/off. The page buffer circuit BF may operate in response to buffer control signals BCS transmitted from the control circuit 121. The buffer control signals BCS may include a first connection signal SS1, a second connection signal SS2, a first pre-charge signal PS1, a second pre-charge signal PS2, a third pre-charge signal PS3, a discharge signal DCS, a set signal SET, a first reset signal RS1, a second reset signal RS2, a clamping signal CS, and first and second operating voltages VOP1 and VOP2.

The page buffer circuit BF may include a sensing circuit 210 and a clamping circuit 220.

The sensing circuit 210 may be connected to the bit line BL. The sensing circuit 210 may pre-charge a sensing node SO by using the first operating voltage VOP1. In addition, the sensing circuit 210 may sense a voltage level of the sensing node SO changed according to a state of the bit line BL and operation of the clamping circuit 220, and store the sensing result therein. Specifically, the sensing circuit 210 may compare the voltage level of the sensing node SO with a reference level, and store the comparison result therein.

The sensing circuit 210 may include a first connection circuit 211, a first pre-charge circuit 212, a second connection circuit 213, a second pre-charge circuit 214, a discharge circuit 215, a storage circuit 216, and a set circuit 217.

The first connection circuit 211 may be connected between the bit line BL and a first intermediate node CN1. The first connection circuit 211 may connect the bit line BL to the first intermediate node CN1 in response to the first connection signal SS1 that is enabled. The first connection circuit 211 may disconnect the bit line BL from the first intermediate node CN1 in response to the first connection signal SS1 that is disabled. For example, the first connection circuit 211 may include a first NMOS transistor N1. The first NMOS transistor N1 may connect the bit line BL to the first intermediate node CN1 in response to the first connection signal SS1 that is enabled at a logic high level. The first NMOS transistor N1 may disconnect the bit line BL from the first intermediate node CN1 in response to the first connection signal SS1 that is disabled at a logic low level.

The first pre-charge circuit 212 may be connected between a first operating voltage node VOP1N and the first intermediate node CN1. The first operating voltage node VOP1N may be a node to which the first operating voltage VOP1 is supplied. The first operating voltage VOP1 may be, for example, a core voltage. The first operating voltage VOP1 may be a voltage generated by the control circuit 121 on the basis of an external voltage supplied from the controller 10. The first pre-charge circuit 212 may connect the first operating voltage node VOP1N to the first intermediate node CN1 in response to the first pre-charge signal PS1 that is enabled. The first pre-charge circuit 212 may pre-charge the first intermediate node CN1 by using the first operating voltage VOP1 in response to the enabled first pre-charge signal PS1. The first pre-charge circuit 212 may disconnect the first operating voltage node VOP1N from the first intermediate node CN1 in response to the first pre-charge signal PS1 that is disabled. For example, the first pre-charge circuit 212 may include a second NMOS transistor N2. The second NMOS transistor N2 may connect the first operating voltage node VOP1N to the first intermediate node CN1 in response to the first pre-charge signal PS1 that is enabled at a logic high level. The second NMOS transistor N2 may disconnect the first operating voltage node VOP1N from the first intermediate node CN1 in response to the first pre-charge signal PS1 that is disabled at a logic low level.

The second connection circuit 213 may be connected between the first intermediate node CN1 and the sensing node SO. The second connection circuit 213 may connect the first intermediate node CN1 to the sensing node SO in response to the second connection signal SS2 that is enabled. The second connection circuit 213 may disconnect the first intermediate node CN1 from the sensing node SO in response to the second connection signal SS2 that is disabled. For example, the second connection circuit 213 may include a third NMOS transistor N3. The third NMOS transistor N3 may connect the first intermediate node CN1 to the sensing node SO in response to the second connection signal SS2 that is enabled at a logic high level. The third NMOS transistor N3 may disconnect the first intermediate node CN1 from the sensing node SO in response to the second connection signal SS2 that is disabled at a logic low level.

The second pre-charge circuit 214 may be connected between the first operating voltage node VOP1N and the sensing node SO. The second pre-charge circuit 214 may connect the first operating voltage node VOP1N to the sensing node SO in response to a voltage level of a data node QS, the second pre-charge signal PS2 that is enabled, and the third pre-charge signal PS3 that is enabled. The second pre-charge circuit 214 may pre-charge the sensing node SO by using the first operating voltage VOP1 in response to the enabled second pre-charge signal PS2 and the enabled third pre-charge signal PS3. For example, the second pre-charge circuit 214 may include a first PMOS transistor P1, a second PMOS transistor P2, and a third PMOS transistor P3. The first PMOS transistor P1 may connect the first operating voltage node VOP1N to a second intermediate node CN2 in response to a logic low value of the data node QS. The first PMOS transistor P1 may disconnect the first operating voltage node VOP1N from the second intermediate node CN2 in response to a logic high value of the data node QS. The second PMOS transistor P2 may connect the first operating voltage node VOP1N to the second intermediate node CN2 in response to the second pre-charge signal PS2 that is enabled at a logic low level. The second PMOS transistor P2 may disconnect the first operating voltage node VOP1N from the second intermediate node CN2 in response to the second pre-charge signal PS2 that is disabled at a logic high level. The third PMOS transistor P3 may connect the second intermediate node CN2 to the sensing node SO in response to the third pre-charge signal PS3 that is enabled at logic low level. The third PMOS transistor P3 may disconnect the second intermediate node CN2 from the sensing node SO in response to the third pre-charge signal PS3 that is disabled at a logic high level.

The discharge circuit 215 may be connected between the sensing node SO and a second operating voltage node VOP2N. The second operating voltage node VOP2N may be a node to which the second operating voltage VOP2 is supplied. The second operating voltage VOP2 may be, for example, a ground voltage. The second operating voltage VOP2 may be an internal ground voltage generated by the control circuit 121 on the basis of the ground voltage supplied from the controller 10. The discharge circuit 215 may connect the sensing node SO to the second operating voltage node VOP2N in response to the voltage level of the data node QS and the discharge signal DCS that is enabled. The discharge circuit 215 may discharge the sensing node SO in response to the logic high value of the data node QS and the enabled discharge signal DCS. For example, the discharge circuit 215 may include a fourth NMOS transistor N4 and a fifth NMOS transistor N5. The fourth NMOS transistor N4 may connect the sensing node SO to a third intermediate node CN3 in response to the discharge signal DCS that is enabled at a logic high level. The fourth NMOS transistor N4 may disconnect the sensing node SO from the third intermediate node CN3 in response to the discharge signal DCS that is disabled at a logic low level. The fifth NMOS transistor N5 may connect the third intermediate node CN3 to the second operating voltage node VOP2N in response to the logic high value of the data node QS. The fifth NMOS transistor N5 may disconnect the third intermediate node CN3 from the second operating voltage node VOP2N in response to the logic low value of the data node QS.

The storage circuit 216 may store a value corresponding to the voltage level of the sensing node SO. For example, the storage circuit 216 may include first and second inverters IV1 and IV2. Each of the first and second inverters IV1 and IV2 may be connected between the data node QS and an inverted data node QSN. The first inverter IV1 may receive a value of the data node QS, and output an inverted value of the received value to the inverted data node QSN. The second inverter IV2 may receive a value of the inverted data node QSN, and output an inverted value of the received value to the data node QS. The first and second inverters IV1 and IV2 may operate as latches maintaining the values of the data node QS and the inverted data node QSN.

The set circuit 217 may initialize the storage circuit 216, and control a value corresponding to the voltage level of the sensing node SO to be stored in the storage circuit 216, in response to the first reset signal RS1, the second reset signal RS2, the set signal SET, and the voltage level of the sensing node SO. The set circuit 217 may be activated when the voltage level of the sensing node SO is higher than the reference level. For example, the set circuit 217 may include sixth to ninth NMOS transistors N6 to N9. The sixth NMOS transistor N6 may be connected between the data node QS and a set node SN. The sixth NMOS transistor N6 may connect the data node QS to the set node SN in response to the first reset signal RS1 that is enabled at a logic high level. The sixth NMOS transistor N6 may disconnect the data node QS from the set node SN in response to the first reset signal RS1 that is disabled at a logic low level. The seventh NMOS transistor N7 may be connected between the set node SN and the second operating voltage node VOP2N. The seventh NMOS transistor N7 may connect the set node SN to the second operating voltage node VOP2N in response to the second reset signal RS2 that is enabled at a logic high level.

The seventh NMOS transistor N7 may disconnect the set node SN from the second operating voltage node VOP2N in response to the second reset signal RS2 that is disabled at a logic low level. The eighth NMOS transistor N8 may be connected between the inverted data node QSN and the set node SN. The eighth NMOS transistor N8 may connect the inverted data node QSN to the set node SN in response to the set signal SET that is enabled at a logic high level. The eighth NMOS transistor N8 may disconnect the inverted data node QSN from the set node SN in response to the set signal SET that is disabled at a logic low level. The ninth NMOS transistor N9 may be connected between the set node SN and the second operating voltage node VOP2N. The ninth NMOS transistor N9 may connect the set node SN to the second operating voltage node VOP2N in response to the voltage level of the sensing node SO. The ninth NMOS transistor N9 may connect the set node SN to the second operating voltage node VOP2N when the voltage level of the sensing node SO is higher than the reference level. The ninth NMOS transistor N9 may disconnect the set node SN from the second operating voltage node VOP2N when the voltage level of the sensing node SO is lower than the reference level.

The clamping circuit 220 may be connected between the first operating voltage node VOP1N and the sensing node SO. The clamping circuit 220 may be activated on the basis of the clamping signal CS and the voltage level of the sensing node SO. The activated clamping circuit 220 may control the voltage level of the sensing node SO not to drop below a predetermined clamping level. According to an embodiment, the clamping level may be the same voltage level as the voltage level at which the first intermediate node CN1 is pre-charged in a pre-charge period in which the sensing node SO and the first intermediate node CN1 are pre-charged. According to an embodiment, the clamping level may be a voltage level lower than the reference level by a predetermined value.

To activate the clamping circuit 220, the clamping signal CS may be transmitted at a predetermined enable level. In an evaluation period in which the voltage level of the sensing node SO drops according to the state of the bit line BL, the clamping circuit 220 may be activated when receiving the clamping signal CS having the enable level and when the voltage level of the sensing node SO becomes lower than the clamping level. The enable level of the clamping signal CS may be a voltage level capable of activating the clamping circuit 220 when the voltage level of the sensing node SO becomes lower than the clamping level.

The clamping circuit 220 may include a $10^{th}$ NMOS transistor N10. The $10^{th}$ NMOS transistor N10 may include a gate terminal receiving the clamping signal CS, a source terminal connected to the sensing node SO, and a drain terminal connected to the first operating voltage node VOP1N. The enable level of the clamping signal CS may be a value obtained by adding a threshold voltage level of the $10^{th}$ NMOS transistor N10 and the clamping level.

The $10^{th}$ NMOS transistor N10 may be deactivated, that is, turned off, when a difference between the voltage level of the clamping signal CS and the voltage level of the sensing node SO is lower than the threshold voltage level. Even though the $10^{th}$ NMOS transistor N10 receives the clamping signal CS having the enable level, the $10^{th}$ NMOS transistor N10 may be turned off when the difference between the voltage level of the clamping signal CS and the voltage level of the sensing node SO is lower than the threshold voltage level.

On the other hand, the $10^{th}$ NMOS transistor N10 may be activated, that is, turned on, when the difference between the voltage level of the clamping signal CS and the voltage level of the sensing node SO is greater than the threshold voltage level. In other words, the 10th NMOS transistor N10 may be turned on when the $10^{th}$ NMOS transistor N10 receives the clamping signal CS having the enable level, and the voltage level of the sensing node SO becomes lower than the clamping level. The turned-on $10^{th}$ NMOS transistor N10 may supply a voltage to the sensing node SO so that the voltage level of the sensing node SO does not drop below the clamping level.

Figure 4:
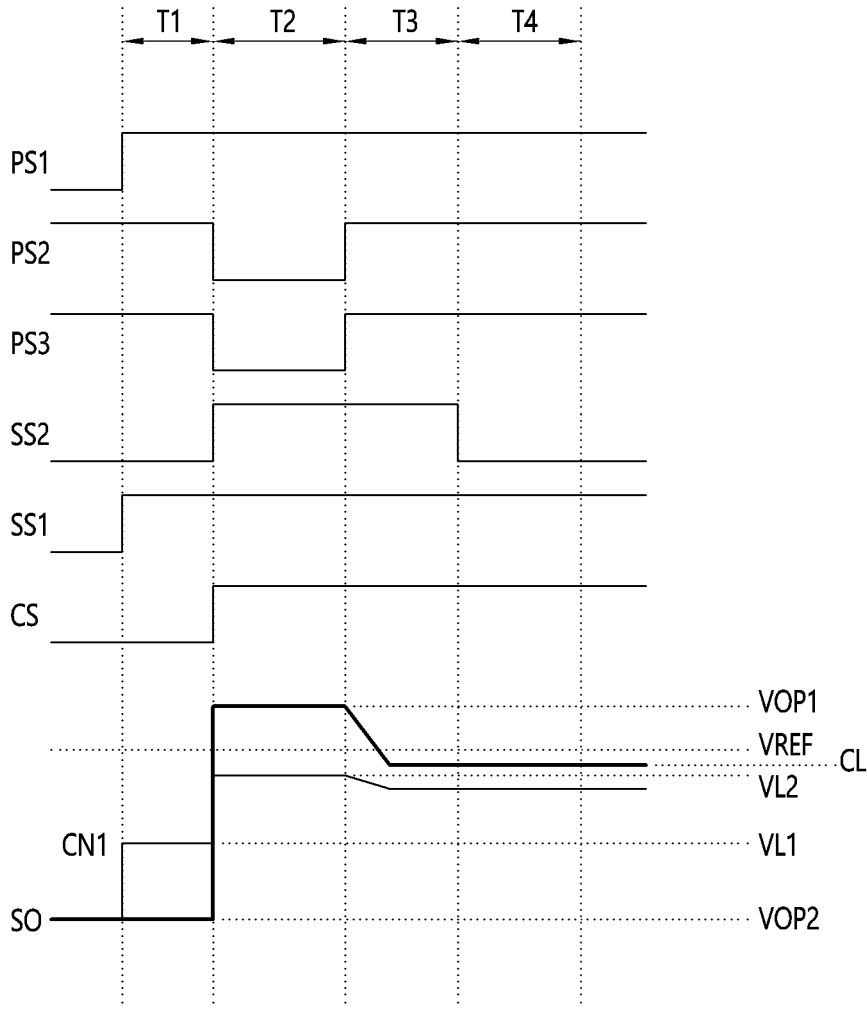
FIG. 4 is a timing diagram illustrating signals applied to the page buffer circuit of FIG. 3, according to an embodiment of the present disclosure.

FIG. 4 is a timing diagram illustrating the signals applied to the page buffer circuit BF of FIG. 3, according to an embodiment of the present disclosure. A reference level VREF may be a minimum voltage level of the sensing node SO capable of turning on the ninth NMOS transistor N9.

Referring to FIGS. 3 and 4, the sensing operation may include a first period T1, a second period T2, a third period T3, and a fourth period T4.

The first period T1 may be a pre-precharge period. In the first period T1, the sensing circuit 210 may pre-charge the first intermediate node CN1 and the bit line BL under the control of the control circuit 121. Specifically, the second NMOS transistor N2 may be turned on in response to the first pre-charge signal PS1 transitioning from a logic low level to a logic high level. Accordingly, the first intermediate node CN1 may have a first voltage level VL1 obtained by subtracting a threshold voltage level of the second NMOS transistor N2 from a voltage level of the first pre-charge signal PS1. In addition, the first NMOS transistor N1 may be turned on in response to the first connection signal SS1 transitioning from a logic low level to a logic high level. Accordingly, although not illustrated, the bit line BL may have a voltage level obtained by subtracting a threshold voltage level of the first NMOS transistor N1 from a voltage level of the first connection signal SS1. At an end point of the first period T1 and a start point of the second period T2, the second pre-charge signal PS2, the third pre-charge signal PS3, and the second connection signal SS2 may be enabled.

The second period T2 may be a pre-charge period. In the second period T2, the sensing circuit 210 may pre-charge the sensing node SO and the first intermediate node CN1 under the control of the control circuit 121. Specifically, the second PMOS transistor P2 may be turned on in response to the second pre-charge signal PS2 transitioning from a logic high level to a logic low level. The third PMOS transistor P3 may be turned on in response to the third pre-charge signal PS3 transitioning from a logic high level to a logic low level. The third NMOS transistor N3 may be turned on in response to the second connection signal SS2 transitioning from a logic low level to a logic high level. Accordingly, the sensing node SO may have a voltage level of the first operating voltage VOP1. In addition, the first intermediate node CN1 may have a second voltage level VL2 obtained by subtracting a threshold voltage level of the third NMOS transistor N3 from a voltage level of the second connection signal SS2.

In the second period T2, the clamping signal CS may be enabled. The enable level of the clamping signal CS may be a voltage level at which the $10^{th}$ NMOS transistor N10 is turned on when the voltage level of the sensing node SO is lower than a clamping level CL. According to an embodiment, the enable level of the clamping signal CS may be a value obtained by adding the threshold voltage level of the $10^{th}$ NMOS transistor N10 and the clamping level CL. According to an embodiment, the clamping level CL may be the same voltage level as the second voltage level VL2 at which the first intermediate node CN1 is pre-charged in the second period T2. According to an embodiment, the clamping level CL may be a voltage level lower than the reference level VREF by a predetermined value. Therefore, even though the clamping signal CS is enabled in the second period T2, a gate-to-source voltage level of the $10^{th}$ NMOS transistor N10 might not be higher than the threshold voltage level of the $10^{th}$ NMOS transistor N10 because the sensing node SO has the voltage level of the first operating voltage VOP1, and consequently, the $10^{th}$ NMOS transistor N10 may remain turned off.

FIG. 4 illustrates that the clamping signal CS transitions from a disabled level to an enabled level at the start point of the second period T2. However, according to an embodiment, the clamping signal CS may transition from the disabled level to the enabled level at any point of the second period T2. At an end point of the second period T2 and a start point of the third period T3, the second pre-charge signal PS2 and the third pre-charge signal PS3 may be disabled at the logic high level.

The third period T3 may be an evaluation period. In the third period T3, the state of the bit line BL, that is, the voltage level of the bit line BL or the amount of current flowing through the bit line BL, may be changed according to the states of the memory cells connected to the bit line BL, and the voltage level of the sensing node SO may be changed according to the state of the corresponding bit line BL. Specifically, the second PMOS transistor P2 may be turned off in response to the second pre-charge signal PS2 transitioning from the logic low level to the logic high level. The third PMOS transistor P3 may be turned off in response to the third pre-charge signal PS3 transitioning from the logic low level to the logic high level. Therefore, when the memory cells connected to the bit line BL are turned on, current may flow from the sensing node SO to the source line SL through the bit line BL, and thus the voltage levels of the sensing node SO and the first intermediate node CN1 may drop. In addition, when the voltage level of the sensing node SO becomes lower than the clamping level CL, the gate-to-source voltage level of the $10^{th}$ NMOS transistor N10 becomes lower than the threshold voltage level of the $10^{th}$ NMOS transistor N10, and thus the $10^{th}$ NMOS transistor N10 may be turned on. Accordingly, current flows from the first operating voltage node VOP1N to the sensing node SO through the $10^{th}$ NMOS transistor N10, and the voltage level of the sensing node SO might not drop any further below the clamping level CL.

Moreover, when the $10^{th}$ NMOS transistor N10 is turned on, the voltage level of the first intermediate node CN1 may also drop slightly from the clamping level CL. When the clamping level CL is set to be equal to (or substantially similar to) the second voltage level VL2, the voltage level of the first intermediate node CN1 may drop only slightly from the second voltage level VL2. Accordingly, as will be further described with reference to FIG. 5, noise due to a coupling phenomenon may be suppressed, and thus accuracy of the sensing operation may be improved. At an end point of the third period T3 and a start point of the fourth period T4, the second connection signal SS2 may be disabled.

The fourth period T4 may be a sensing period. In the fourth period T4, the third NMOS transistor N3 may be turned off in response to the second connection signal SS2 transitioning from the logic high level to the logic low level. In the fourth period T4, the sensing node SO may maintain the voltage level of the sensing node SO at the end point of the third period T3 as it is. The storage circuit 216 may store a value corresponding to the voltage level of the sensing node SO. Specifically, the value of the data node QS may be determined as the ninth NMOS transistor N9 is turned on or off according to whether the voltage level of the sensing node SO is higher or lower than the reference level VREF.

Figure 5:
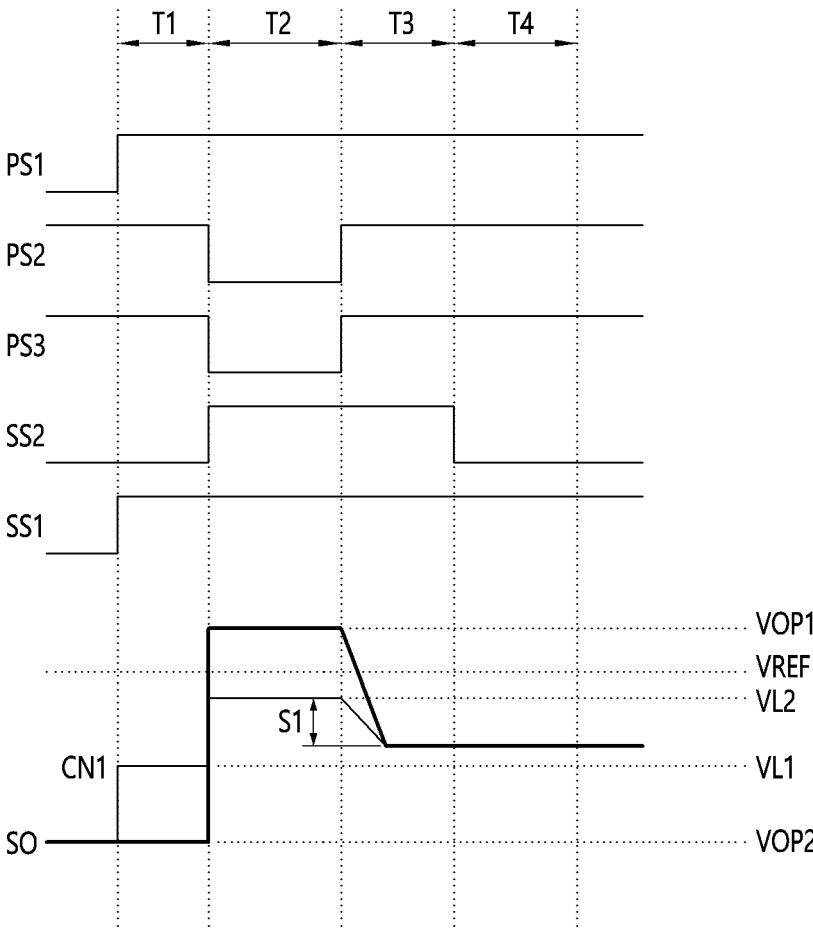
FIG. 5 is a timing diagram illustrating a case in which a page buffer circuit does not include a clamping circuit.

FIG. 5 is a timing diagram illustrating a case in which the page buffer circuit BF does not include the clamping circuit 220. Alternatively, FIG. 5 may be a timing diagram illustrating a case in which the clamping circuit 220 included in the page buffer circuit BF does not operate.

Referring to FIG. 5, all the signals may operate in the same way as the signals of FIG. 4. In the third period T3, when the memory cells connected to the bit line BL are turned on, current may flow from the sensing node SO to the source line SL through the bit line BL, and thus the voltage levels of the sensing node SO and the first intermediate node CN1 may drop. In addition, the voltage level of the first intermediate node CN1 may drop excessively by a width S1 due to a difference between the second connection signal SS2 and the first pre-charge signal PS1, that is, a difference between the second voltage level VL2 and the first voltage level VL1. In this case, noise due to a coupling phenomenon may occur in the bit line BL, and thus accuracy of the sensing operation may decrease.

However, according to the present teachings, as described with reference to FIG. 4, the clamping level CL may be set equal to or substantially similar to the second voltage level VL2. In addition, the voltage level of the sensing node SO may be controlled not to drop below the clamping level CL through the operation of the clamping circuit 220. Accordingly, the voltage level of the first intermediate node CN1 might not greatly drop, and the noise due to the coupling phenomenon might not occur in the bit line BL.

A person skilled in the art to which the present teachings pertains will understand that the present teachings may be carried out in other specific forms without changing its technical spirit or essential features. Therefore, the embodiments described above are illustrative in all aspects, not limitative. The scope of the present teachings is defined by the claims to be described below rather than the detailed description, and it should be construed that the meaning and scope of the claims and all changes or modified forms derived from the equivalent concept thereof are included in the scope of the present teachings.

What is claimed is:

1. A page buffer circuit of a memory device, comprising:
a sensing circuit configured to sense a voltage level of a sensing node changed according to a state of a bit line during a sensing operation, the sensing node being connected to the bit line through an intermediate node; and
a clamping circuit connected to the sensing node, the clamping circuit configured to control the voltage level of the sensing node not to drop below a clamping level in a predetermined period of the sensing operation, wherein the clamping level corresponds to a voltage level at which the intermediate node is pre-charged in a pre-charge period in which the sensing node and the intermediate node are pre-charged.

2. The page buffer circuit according to claim 1, wherein the predetermined period includes an evaluation period in which the voltage level of the sensing node drops according to the state of the bit line, and
wherein the clamping circuit, in the evaluation period, is activated when receiving a clamping signal having an enabled level and when the voltage level of the sensing node becomes lower than the clamping level.

3. The page buffer circuit according to claim 2, wherein the clamping signal transitions from a disabled level to the enabled level in a pre-charge period in which the sensing node is pre-charged.

4. The page buffer circuit according to claim 3, wherein the clamping circuit is deactivated even though the clamping signal has the enabled level when the sensing node is pre-charged in the pre-charge period.

5. The page buffer circuit according to claim 1, wherein the clamping circuit includes a transistor including a gate terminal receiving a clamping signal, a source terminal connected to the sensing node, and a drain terminal connected to an operating voltage node.

6. The page buffer circuit according to claim 5, wherein an enabled level of the clamping signal is a value obtained by adding a threshold voltage level of the transistor and the clamping level.

7. The page buffer circuit according to claim 1, wherein the sensing circuit includes a first connection circuit connecting the bit line to the intermediate node in response to a first connection signal and a second connection circuit connecting the intermediate node to the sensing node in response to a second connection signal.

8. The page buffer circuit according to claim 1, wherein the sensing circuit compares the voltage level of the sensing node with a reference level and stores the comparison result therein, and
wherein the clamping level is a voltage level lower than the reference level by a predetermined value.

9. A page buffer circuit of a memory device, comprising:
a sensing circuit configured to compare a voltage level of a sensing node changed according to a state of a bit line with a reference level and store the comparison result therein; and
a clamping circuit configured to supply a voltage to the sensing node when the voltage level of the sensing node becomes lower than a clamping level lower than the reference level according to the state of the bit line.

10. The page buffer circuit according to claim 9, wherein the clamping circuit includes a transistor including a gate terminal receiving a clamping signal, a source terminal connected to the sensing node, and a drain terminal connected to an operating voltage node.

11. The page buffer circuit according to claim 10, wherein an enabled level of the clamping signal is a value obtained by adding a threshold voltage level of the transistor and the clamping level.

12. The page buffer circuit according to claim 9, wherein the sensing circuit includes a first connection circuit connecting the bit line to an intermediate node in response to a first connection signal and a second connection circuit connecting the intermediate node to the sensing node in response to a second connection signal, and
wherein the clamping level is the same voltage level as a voltage level at which the intermediate node is pre-charged in a pre-charge period in which the sensing node and the intermediate node are pre-charged.

13. A peripheral circuit of a memory device, comprising:
a page buffer circuit configured to compare a voltage level of a sensing node formed on the basis of a state of a bit line and a clamping signal, with a reference level and store a result of the comparison; and
a control circuit configured to generate the clamping signal and transmit the clamping signal to the page buffer circuit,
wherein the page buffer circuit includes a clamping circuit configured to control the voltage level of the sensing node, based on the clamping signal and the voltage level of the sensing node, so that the voltage level of the sensing node does not drop below a clamping level lower than the reference level.

14. The peripheral circuit according to claim 13, wherein the clamping circuit is activated when receiving the clamping signal having an enabled level and when the voltage level of the sensing node becomes lower than the clamping level, in an evaluation period in which the voltage level of the sensing node drops according to the state of the bit line.

15. The peripheral circuit according to claim 14, wherein the control circuit transitions the clamping signal from a disabled level to the enabled level in a pre-charge period in which the sensing node is pre-charged.

16. The peripheral circuit according to claim 15, wherein the clamping circuit is deactivated even though the clamping signal has the enabled level when the sensing node is pre-charged in the pre-charge period.

17. The peripheral circuit according to claim 13, wherein the clamping circuit includes a transistor including a gate terminal receiving the clamping signal, a source terminal connected to the sensing node, and a drain terminal connected to an operating voltage node, and wherein an enabled level of the clamping signal is a value obtained by adding a threshold voltage level of the transistor and the clamping level.

18. The peripheral circuit according to claim 13, wherein the page buffer circuit further includes a first connection circuit connecting the bit line to an intermediate node in response to a first connection signal and a second connection circuit connecting the intermediate node to the sensing node in response to a second connection signal, and wherein the clamping level is the same voltage level as a voltage level at which the intermediate node is pre-charged in a pre-charge period in which the sensing node and the intermediate node are pre-charged.

* * * * *